(12) United States Patent
Tuppen et al.

(10) Patent No.: US 8,141,225 B2
(45) Date of Patent: Mar. 27, 2012

(54) METHOD OF MANUFACTURING A COMPONENT BY CONSOLIDATING POWDER MATERIAL

(75) Inventors: Stephen Tuppen, Swadlincote (GB); Wayne E. Voice, Nottingham (GB)

(73) Assignee: Rolls-Royce, PLC, London (GB)

( * ) Notice: Subject to any disclaimer, the term of this patent is extended or adjusted under 35 U.S.C. 154(b) by 1106 days.

(21) Appl. No.: 12/007,961

(22) Filed: Jan. 17, 2008

(65) Prior Publication Data

US 2010/0281669 A1 Nov. 11, 2010

(30) Foreign Application Priority Data

Feb. 1, 2007 (GB) .................................. 0701904.5

(51) Int. Cl.
*B23Q 3/00* (2006.01)
*B23K 35/12* (2006.01)
(52) U.S. Cl. .......................................... 29/464; 228/249
(58) Field of Classification Search ............... 29/402.13, 29/402.11, 402.18, 402.16, 402.09, 402.01, 29/464, 466–469; 228/249, 159
See application file for complete search history.

(56) References Cited

U.S. PATENT DOCUMENTS

| 3,656,222 | A | 4/1972 | Jones |
| 3,905,723 | A | 9/1975 | Torti, Jr. |
| 4,172,107 | A | 10/1979 | Nakamura et al. |
| 4,594,219 | A | 6/1986 | Hostatter et al. |
| 5,788,142 | A | 8/1998 | Bigay et al. |

FOREIGN PATENT DOCUMENTS

| DE | 10 2005 019 077 A1 | 10/2006 |
| EP | 0 194 504 A2 | 9/1986 |
| GB | 1193129 A | 5/1970 |
| JP | A 58-41775 | 3/1983 |
| JP | A 59-64185 | 4/1984 |
| JP | A 63-72804 | 4/1988 |
| JP | A 8-225811 | 9/1996 |

*Primary Examiner* — John C Hong
(74) *Attorney, Agent, or Firm* — Oliff & Berridge, PLC

(57) ABSTRACT

A method of manufacturing a blisk comprising a disc joined to an aerofoil, wherein a union piece of partially sintered powder and having an alignment feature is provided. The union piece is connected between the disc and the aerofoil, which is aligned relative to the disc by the alignment feature of the union piece. Heat and pressure is subsequently applied to consolidate the first workpiece, union piece and second workpiece.

16 Claims, 4 Drawing Sheets

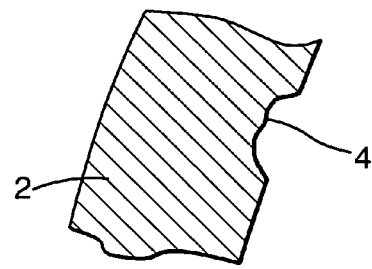
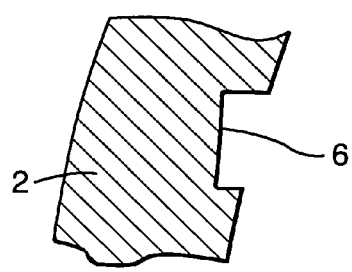
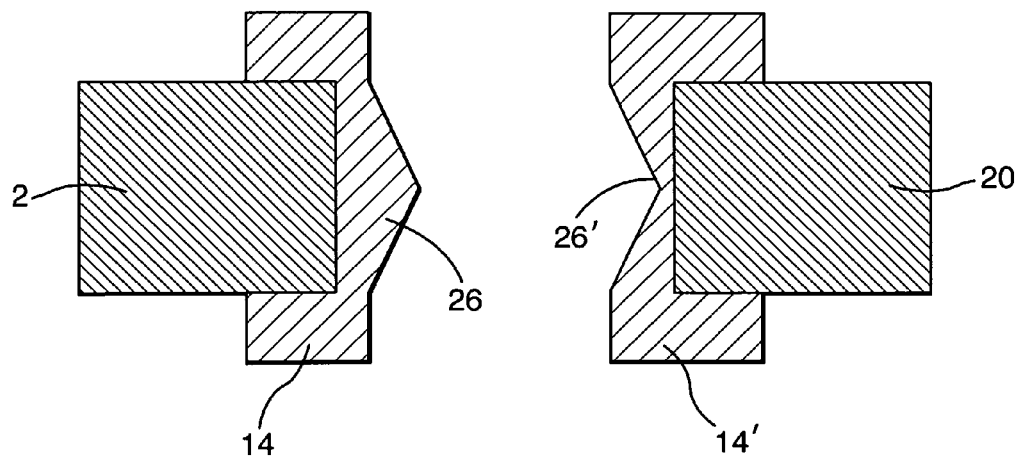

METHOD OF MANUFACTURING A COMPONENT BY CONSOLIDATING POWDER MATERIAL

This invention relates to a method of manufacturing an aerofoil component using a consolidated powder material union piece and articles so manufactured.

U.S. Pat. No. 5,788,142 describes a method of joining components using an intermediate part of compacted and formed particles. The compacted intermediate part is formed of constituent elemental particles which in admixture provide a composition similar to the composition of the components. The intermediate part is formed as a sheet.

Aerofoils used in turbine engines may be grouped into a unitary assembly of similar aerofoils, commonly, and generally known in the industry as a blisk. Blisks are high value components and are at risk from sustaining damage from handling and machining operations as well as sustaining in service damage from ingestion of foreign objects into the engine or by erosion or wear to the aerofoils. Because of their high value it is desirable to repair damaged portions of blades and disks to return the blisk into service.

One method that has been proposed is to deposit metal onto the damaged area by localised molten metal deposition. This technique may have been acceptable for conventional blades but newer blades use materials which can resist higher temperatures but are more brittle and are damaged by the melting. Because aerofoils in turbine engines rotate at many thousands of RPM any damage to their internal structure can have catastrophic effects.

It is an object of the present invention to seek to provide an improved method of manufacture of an article, or particularly repair of an article using consolidated powder material.

According to a first aspect of the invention there is provided a method of manufacturing an aerofoil component comprising a first workpiece joined to a second workpiece, the method comprising, providing a first workpiece and a second workpiece, providing a union piece formed of partially sintered powder, the union piece having an alignment feature for aligning the first workpiece with the second workpiece, assembling the first workpiece to the second workpiece via the alignment feature, and applying heat and pressure to consolidate the first workpiece, the union piece and second workpiece.

Preferably the alignment feature comprises a recess into which at least a portion of the second workpiece is inserted.

The second workpiece may comprise a second union piece formed of partially sintered powder and having an alignment feature complementary to the alignment feature and wherein the second workpiece is connected to the union piece via the alignment feature and the complimentary alignment feature.

Preferably the alignment feature is a pyramidical recess and the complementary alignment feature a pyramidical projection.

Preferably a portion of the union piece is removed following consolidation by machining.

Preferably the first workpiece has an aerodynamic surface and the second workpiece has an aerodynamic surface and the portion of the union piece removed blends the aerodynamic surface of the first workpiece to the aerodynamic surface of the second workpiece.

The aerodynamic surface of the first workpiece may be a pressure flank or suction flank on the aerofoil component.

The first workpiece may have a faying surface which abuts the union piece prior to consolidation and the second workpiece a faying surface which abuts the union piece prior to consolidation, wherein the thickness of the union piece between the faying surface of the first workpiece and the faying surface of the second workpiece is less than 500 μm.

The first workpiece may comprise part of a unitary assembly of aerofoils. The second workpiece may be a repair patch for the aerofoil component.

The method may comprise the step of allocating the first workpiece with a plurality of standard zones and removing a portion of the first workpiece corresponding to at least one of the standard zones to provide a faying location, wherein the alignment feature of the union piece complements the faying location.

Preferably the standard zones are arranged along the leading edge and/or trailing edges of the aerofoil.

According to a second aspect of the invention there is provided a method of repairing an aerofoil component having damage or a defect comprising the step of allocating the aerofoil with a plurality of standard zones, determining the zone in which the damage or defect resides, removing a portion of the aerofoil in accordance with the zone in which the damage or defect resides to provide a faying location, providing a union piece formed of partially sintered powder and having an alignment feature complementing the faying location, assembling a repair patch to the aerofoil via the union piece, and applying heat and pressure to consolidate the aerofoil, union piece and repair patch.

Embodiments of the invention will now be described by way of example only, with reference to the accompanying drawings, in which:

FIG. 1 depicts a blade with a damaged portion;

FIG. 4 depicts an embodiment where the repair patch is bonded to a second union piece prior to joining to the first union piece.

FIG. 1 depicts an aerofoil blade 2 having a damaged portion 4 possibly damaged by foreign object impact (FOD) or some other wear or impact damage.

Figure 2A:
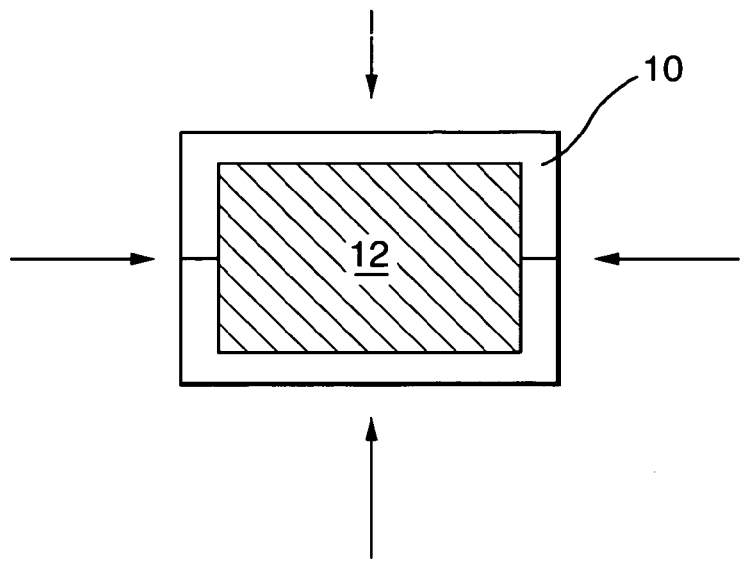
FIG. 2 is a depiction of the preferred manufacturing route for the union piece.

The aerofoil 2 is formed of a material suitable for use in the gas turbine. Particularly preferred materials are intermetallic alloys such as gamma titanium aluminide though it will be appreciated that the invention is appropriate to metals and their constituent alloys.

The damaged portion has a rough surface and before any repair is made the surface is machined to provide a more uniform surface finish of the order 1 μm Ra. The surface may be cleaned, preferably using a swab etch of HF and $HNO_3$ followed by an acetone swab for a titanium alloy. This provides a clean recess for attachment of a repair patch.

A mould or other 3-dimensional scan is taken of the aerofoil blade to determine the shape of the union piece required. The union piece itself is formed of a powder with a particle diameter typically below 100 μm and preferably below 50 μm in the range 20 to 40 μm. The powder preferably with the same nominal chemical composition of the aerofoil blade and the repair patch. Where the two components have different chemical compositions the composition of the powder is preferably an intermediate the two compositions. Other powder compositions may be used provided the function of the repaired component is not impaired.

Figure 2B:
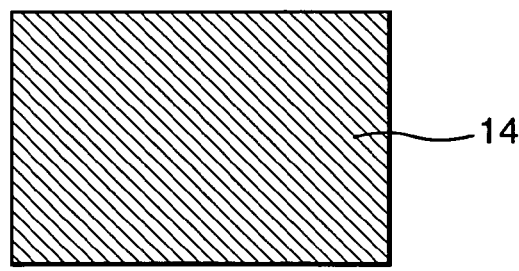
Figure 2C:
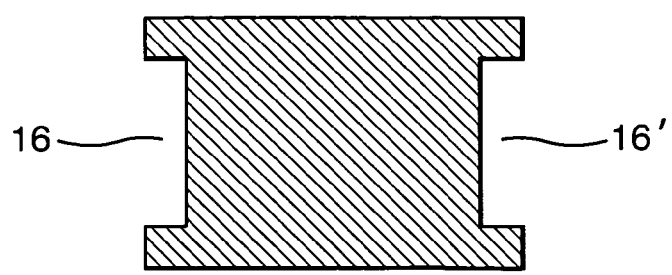

The manufacturing process of the union piece is depicted in FIG. 2. The mould is transposed to a shaped die 10 into which the powder 12 is inserted, compacted and partially sintered to form the preformed union piece 14. The compacting pressure is of the order 200 MPa with the sintering being performed at a temperature of around 600-900° C. for about 15-60 minutes.

The union piece 14 is bespoke to the components being joined and preferably has a thickness X which between the faying surface of the aerofoil and the faying surface of the repair patch of between 200 μm and 2000 μm. For the majority of aerofoil repairs, where damage occurs to the leading or trailing edges of the blade it is desirable that the thickness is between 200 μm and 500 μm. Blade at this location have a width Y typically between 2 and 8 mm.

The union piece 14 is machined to form an alignment feature or features 16, 16' which will assist the alignment of the repair patch with the aerofoil. The alignment feature is at its simplest a recess or groove into which a complementary portion of the repair patch is inserted.

Figure 3:
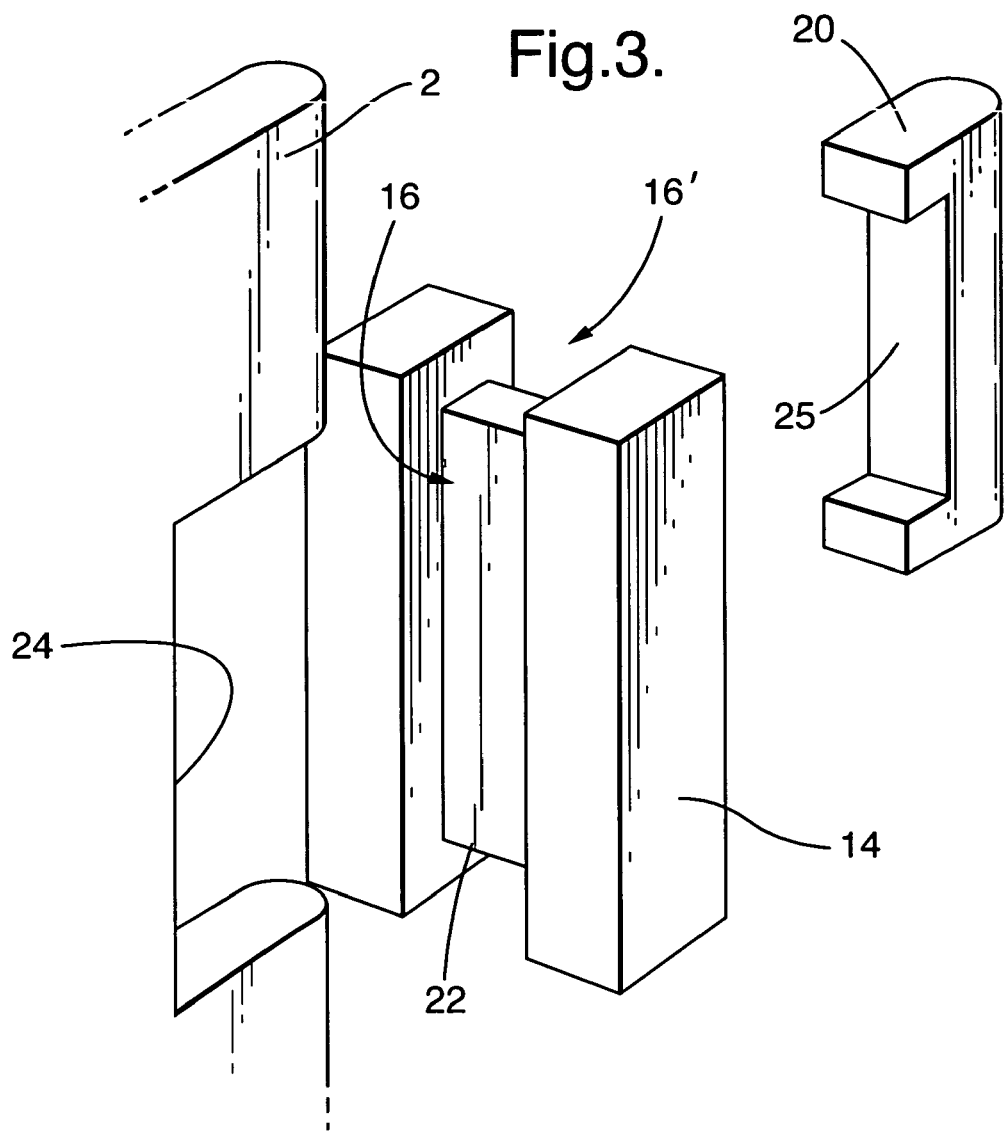
FIG. 3 is a perspective view of a manufactured union piece, aerofoil portion and repair patch.
Figure 3A:
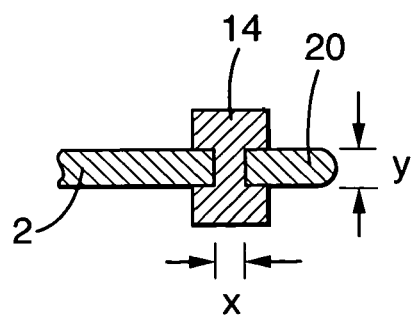

FIG. 3 depicts a perspective view of one embodiment of a sintered union piece 14, aerofoil 2 and repair patch 20. The aerofoil is inserted into the groove in the union piece till the machined faying face of the aerofoil 24 abuts a corresponding flat face 22 on the union piece. The union piece extends widthwise beyond the aerofoil to aid both alignment and the joining step which consolidates the union piece with the aerofoil and repair patch.

The union piece is clamped to the aerofoil and the repair patch 20 connected to the assembly using the alignment feature of the union piece. The repair patch is provided with a recess which mates with the alignment features in the union piece.

The alignment features enable the repair patch and aerofoil to be presented to each other with correct positioning. Beneficially, it is possible to create alignment features which allow the parts to be assembled in just one orientation thereby reducing the chance of mistakes. As an additional benefit, the alignment features may be sized to provide an interference fit with the repair patch or aerofoil to aid assembly and reduce the number of clamps required.

As mentioned above it is desirable that the thickness of the union piece 14 between the faying surface 24 of the aerofoil and the faying surface 25 of the repair patch is kept below 500 μm. It has been found that the thicker the union piece, which does not have the same material structure as the virgin cast aerofoil 2 and repair patch 20, the greater the risk of pores or other deleterious artefacts damaging the integrity of the repaired aerofoil.

In an alternative method of construction the union piece is attached to the aerofoil and the alignment feature formed therein whilst the union piece is in situ.

Once the patch, blade and union piece are aligned a shroud, jacket or bag is placed around the assembly and either evacuated or filled with an inert gas to minimise the risk of oxidation of the aerofoil or patch. Uniform pressure of between 25 and 100 Mpa is applied to form a butt joint and heat is applied locally to heat the union piece to a bonding temperature of between 850 and 1200° C. to both fully sinter the union piece and to consolidate it with the joint surfaces.

Due to the application of heat and pressure a small amount of sintered powder is extruded from the join to leave a residue along the edges of the join. The residue is removed during the dressing stage along with the oversized union piece to achieve final part geometry. Either chemical or mechanical machining may be used to remove the residue and/or the union piece.

The components are cooled at a rate of the order 5° C./min to minimise residual stresses generated locally to the join. A post join heat treatment may be used to further reduce residual stresses.

The repair patch may also be provided with a union piece as depicted in FIG. 4. In this embodiment both the aerofoil 2 and the repair patch are provided with separate union pieces formed from sintered powder as described above.

Beneficially, the union pieces are easier to machine than the aerofoil and repair patch particularly when these components are formed of an intermetallic material such as titanium gamma aluminide. As the union pieces are easier to machine it is possible to provide better and more elaborate alignment features. For example, in FIG. 4 the alignment feature in the first union piece 14 is a pyramidical projection 26. Such alignment features aid the butting of the union pieces and consequently the joining of the aerofoil with the repair patch.

Various modifications may be made without departing from the inventive concept.

For example, the union piece may be formed primarily as a generic cube which is machined to its final dimensions. As a further alternative the union piece may be formed by a process of direct metal deposition where powder or wire is fed onto a substrate, which may be the aerofoil blade, whilst the substrate is heated and partially melted by a traversing laser beam. The traversing beam forms a melt pool into which the powder is directed and melted. As the melt pool cools the powder solidifies to provide a deposit with a height. Repeated passes of the laser over the deposit enables layers of powder to be repeatedly provided, partially melted and solidified thereby increasing the height of the deposit. Beneficially manufacturing via this route, as the laser partially sinters the powder, it is possible to dispense of an additional partial sinter step. In some circumstances it may be possible to sinter the material without heating it to a temperature at which it melts.

Similarly, whilst the above invention has been described with respect to aerofoils and repair patches therefore it will be appreciated that the invention is equally appropriate to other components either inside the aerospace industry or outside the aerospace industry e.g. the energy industry.

It will be appreciated that the above described invention provides a relatively simple and low-cost solution for repairing complex geometries. As the component parts are provided with alignment features the repair process can be automated.

The invention has been described with respect to having union pieces specifically designed for the repair required. Because the union piece has to be manufactured using specialist equipment this can be time consuming, particularly where the piece needs to be ordered for manufacture. It is desirable to have the union piece, where possible, as a stock item. Where the piece is a stock item the repair patch may also be a stock item and pre-arranged with the union piece.

Figure 5:
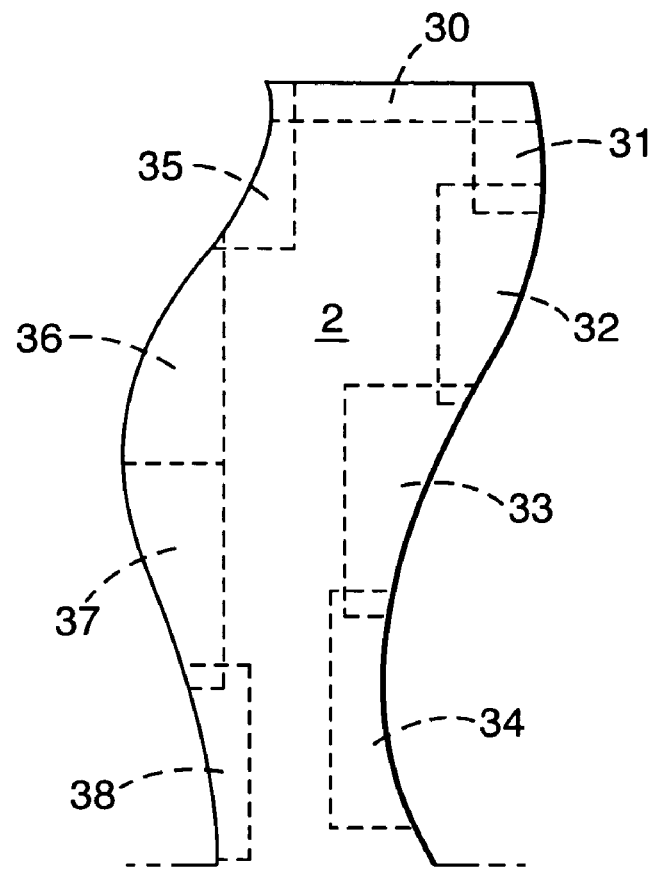
FIG. 5 depicts an aerofoil subdivided into a series of preselected zones.
Figure 6:
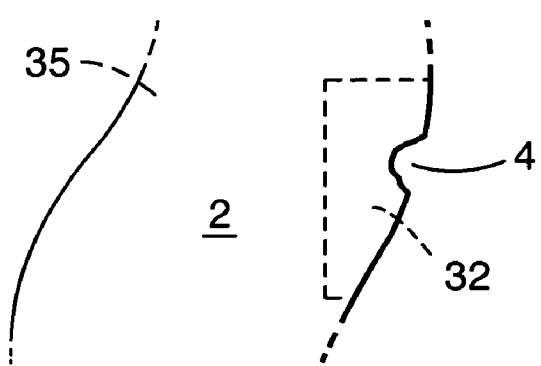
FIG. 6 depicts a zone in which damage has been identified.

As depicted in FIG. 5, to make the union piece a stock item the most frequent repair reasons and locations are identified. As mentioned above the most typical region experiencing damage in a aerofoil is its leading and trailing edges. Each edge is subdivided into a series of zones 30 to 38 extending part-way along the length of the blade. The zones can overlap When damage or a defect is identified in the blade the zone in which it occurs is determined through routine inspection. Material is removed from the blade 2 to match the profile of the standard zone in which it is found. Removal of material to the standard zone can result the much more of the aerofoil being machined away than strictly required to simply provide a surface suitable for attaching a new repair, as shown in FIG. 6 where the damage 4 occurs in zone 32 and the whole of zone 32 is removed.

A number of stock union pieces equivalent for each of the zones are manufactured and supplied to the repair facility in advance. The repair patch 20 may be pre-assembled to the union piece allowing the piece to be tested prior to supply.

The union piece is assembled to the aerofoil following the procedure detailed above.

It will be appreciated that by following the above method a repair may be made to most locations on the aerofoil using a relatively small number of stock items. Where damage occurs outside a designated zone it will be necessary to manufacture a specific union piece for that damage.

We claim:

1. A method of manufacturing an aerofoil component comprising a first workpiece joined to a second workpiece, the method comprising,
   providing a first workpiece and a second workpiece,
   providing a union piece formed of partially sintered powder, the union piece having an alignment feature for aligning the first workpiece with the second workpiece,
   assembling the first workpiece to the second workpiece via the alignment feature, and
   applying heat and pressure to consolidate the first workpiece, the union piece and second workpiece.

2. A method according to claim 1, wherein the alignment feature comprises a recess into which at least a portion of the second workpiece is inserted.

3. A method according to claim 1 wherein the second workpiece comprises a second union piece formed of partially sintered powder and having an alignment feature complementary to the alignment feature and wherein the second workpiece is connected to the second union piece via the alignment feature and the complimentary alignment feature.

4. A method according to claim 3, wherein the complementary alignment feature is a pyramidical projection.

5. A method according to claim 1, wherein the alignment feature is a pyramidical recess.

6. A method according to claim 1, wherein a portion of the union piece is removed following consolidation by machining.

7. A method according to claim 6, wherein the first workpiece has an aerodynamic surface and the second workpiece has an aerodynamic surface and the portion of the union piece removed blends the aerodynamic surface of the first workpiece to the aerodynamic surface of the second workpiece.

8. A method according to claim 7, wherein the aerodynamic surface of the first workpiece is a pressure flank on the aerofoil component.

9. A method according to claim 7, wherein the aerodynamic surface of the first workpiece is a suction flank on the aerofoil component.

10. A method according to claim 1, wherein the first workpiece has a faying surface which abuts the union piece prior to consolidation and the second workpiece has a faying surface which abuts the union piece prior to consolidation, wherein the thickness of the union piece between the faying surface of the first workpiece and the faying surface of the second workpiece is less than 500 µm.

11. A method according to claim 10, wherein the thickness of the union piece between the faying surface of the first workpiece and the faying surface of the second workpiece is between 50 and 200 µm.

12. A method according to claim 1, wherein the first workpiece comprises part of a unitary assembly of aerofoils.

13. A method according to claim 1, wherein the second workpiece is a repair patch for the aerofoil component.

14. A method according to claim 1, further comprising the step of allocating the first workpiece with a plurality of standard zones and removing a portion of the first workpiece corresponding to at least one of the standard zones to provide a faying location, wherein the alignment feature of the union piece complements the faying location.

15. A method according to claim 14, wherein the standard zones are arranged along a leading edge of the aerofoil.

16. A method according to claim 14, wherein the standard zones are arranged along a trailing edge of the aerofoil.

* * * * *